US012671072B2

(12) United States Patent (10) Patent No.: US 12,671,072 B2
Daikuhara (45) Date of Patent: Jun. 30, 2026

(54) METHOD OF PRODUCING ELECTRODE

(71) Applicant: Toyota Jidosha Kabushiki Kaisha, Toyota (JP)

(72) Inventor: Shugo Daikuhara, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 755 days.

(21) Appl. No.: 17/862,986

(22) Filed: Jul. 12, 2022

(65) Prior Publication Data

US 2023/0117553 A1 Apr. 20, 2023

(30) Foreign Application Priority Data

Jul. 14, 2021 (JP) ................................. 2021-116279

(51) Int. Cl.
    H01M 10/0525 (2010.01)
    H01M 4/04 (2006.01)
(52) U.S. Cl.
    CPC ..... H01M 4/0407 (2013.01); H01M 10/0525 (2013.01)
(58) Field of Classification Search
    CPC ............. H01M 4/0407; H01M 4/0404; H01M 4/0409; H01M 4/0416; H01M 4/043; H01M 4/0471; H01M 10/0525
    See application file for complete search history.

(56) References Cited

U.S. PATENT DOCUMENTS

| | | |
|---|---|---|
| 6,811,923 B1 | 11/2004 | Sakai et al. |
| 2003/0221996 A1* | 12/2003 | Svoronos .................. B04C 5/13 |
| | | 209/1 |
| 2008/0102372 A1 | 5/2008 | Ohishi |
| 2012/0012776 A1 | 1/2012 | Kagei et al. |
| 2014/0287324 A1 | 9/2014 | Tsuchida et al. |
| 2017/0104205 A1 | 4/2017 | Ishii et al. |
| 2021/0399306 A1 | 12/2021 | Nakano et al. |

FOREIGN PATENT DOCUMENTS

| | | | | |
|---|---|---|---|---|
| CN | 201245584 Y | 5/2009 | | |
| JP | 2001-243947 A | 9/2001 | | |
| JP | 2008108574 A | * 5/2008 | ........ H01M 10/0525 |
| JP | 2009026744 A | * 2/2009 | .......... H01M 10/052 |
| JP | 2011-082188 A | 4/2011 | | |

(Continued)

OTHER PUBLICATIONS

Machine Translation Relied Upon of JP-2008108574-A (Year: 2008).*

(Continued)

*Primary Examiner* — Marla D Mcconnell
*Assistant Examiner* — Olivia A Jones
(74) *Attorney, Agent, or Firm* — Dinsmore & Shohl LLP

(57) ABSTRACT

An active material powder that includes a foreign particle and an active material particle is prepared. A first electrode material that includes the active material powder is prepared. Dry classification treatment is performed on the first electrode material, and thereby the foreign particle included in the first electrode material is decreased. An active material layer that includes the first electrode material after the dry (Continued)

classification treatment is formed. The first electrode material is in powder form. The foreign particle includes a metal foreign object and is a coarse particle.

9 Claims, 3 Drawing Sheets

(56) References Cited

FOREIGN PATENT DOCUMENTS

| | | | |
|----|----|----|----|
| JP | 2013-137928 A | 7/2013 | |
| JP | 2014-102967 A | 6/2014 | |
| JP | 2015-082379 A | 4/2015 | |
| JP | WO2013-073214 A1 | 4/2015 | |
| JP | WO2013-118758 A1 | 5/2015 | |
| JP | 2017-117582 A | 6/2017 | |
| JP | 2019098200 A * | 6/2019 | ......... B05B 13/0228 |
| JP | 2020149862 A * | 9/2020 | .......... H01M 4/0409 |
| JP | 2021-039887 A | 3/2021 | |
| KR | 10-2017-0037885 A | 4/2017 | |
| WO | 2000/0079621 A1 | 12/2000 | |
| WO | WO-2011024708 A1 * | 3/2011 | ............ H01M 4/621 |
| WO | 2013-073214 A1 | 4/2015 | |
| WO | 2013-118758 A1 | 5/2015 | |
| WO | 2020/090694 A1 | 5/2020 | |

OTHER PUBLICATIONS

Machine Translation Relied Upon of JP-2019098200-A (Year: 2019).*
Lixia Ouyang, Zhaohui Wu, Jun Wang, Xiaopeng Qi, Qiang Li, Jiantao Wang, and Shigang Lu; The effect of solid content on the rheological properties and microstructures of a Li-ion battery cathode slurry; Royal Society of Chemistry (Year: 2020).*
Ludwig, B., Zheng, Z., Shou, W. et al. Solvent-Free Manufacturing of Electrodes for Lithium-ion Batteries. Sci Rep 6, 23150 (2016). https://doi.org/10.1038/srep23150 (Year: 2016).*
Machine Translation Relied Upon for WO-2011024708-A1 (Year: 2011).*
Machine Translation Relied Upon for JP-2009026744-A (Year: 2009).*
Frank Schollmeier; Valin Corporation, Filtration and Separation; "Magnetic Filtration—are you using it?"; https://www.filtsep.com/content/features/magnetic-filtration-are-you-using-it; (Year: 2019).*
Machine Translation Relied Upon for JP-2020149862-A (Year: 2020).*

* cited by examiner

FIG.3

METHOD OF PRODUCING ELECTRODE

CROSS REFERENCE TO RELATED APPLICATIONS

This nonprovisional application claims priority to Japanese Patent Application No. 2021-116279 filed on Jul. 14, 2021, with the Japan Patent Office, the entire contents of which are hereby incorporated by reference.

BACKGROUND

Field

The present disclosure relates to a method of producing an electrode.

Description of the Background Art

Japanese Patent Laying-Open No. 2014-102967 discloses a filtration filter for slurry for active material layer formation.

SUMMARY

Conventionally, an electrode of a battery is produced by applying a slurry (a particle dispersion). More specifically, an active material powder, a binding material, and a solvent may be mixed to prepare the slurry. The slurry may be applied to a surface of a substrate to form an active material layer.

The solvent is capable of dissolving the binding material. The solvent also serves as a dispersion medium for solid particles. The solvent may include an organic solvent and/or the like, for example. From the viewpoint of production costs and environmental burdens, for example, reduction of solvent usage in electrode production has been demanded. For this purpose, a non-slurry process has been suggested. For example, an active material powder and a binding material are mixed to prepare a powdery and granular composition. This powdery and granular composition may be applied to coat a surface of a substrate to form an active material layer.

The active material powder includes an active material particle. The active material particle causes electrode reaction. Ideally, the active material powder consists of an active material particle. However, the active material powder may also include a trace amount of a metal foreign object. The metal foreign object is unintended impurities. It is expected that the metal foreign object is generated by, for example, wearing of the production facility that is used for producing the active material powder. The metal foreign object is in particle form. The metal foreign object, when enters into an electrode, may adversely influence the battery performance. This influence tends to be manifested especially when the metal foreign object is a coarse particle. For example, it may cause an increase in the amount of self-discharge of the battery.

The metal foreign object may include a magnetic substance (such as iron, for example). Conventionally, the metal foreign object is decreased by performing magnetic separation treatment on the active material powder after the synthesis of the active material powder. However, the separation efficiency of the magnetic separation treatment is not sufficient. For example, an active material particle such as lithium cobalt oxide may be a magnetic substance. When an active material particle is magnetic, the efficiency for separating metal foreign objects may be decreased. This is because the active material particle also adheres to the magnet. Alternatively, the metal foreign object may be a nonmagnetic substance (such as copper, for example).

The metal foreign object may be decreased by dispersing the active material powder in a solvent to prepare a slurry, and filtering the resulting slurry through a filter. However, this slurry process is accompanied by an increased usage of solvent.

An object of the present disclosure is to decrease a metal foreign object in an electrode.

Hereinafter, the technical configuration and effects of the present disclosure will be described. It should be noted that the action mechanism according to the present specification includes presumption. The action mechanism does not limit the technical scope of the present disclosure.

1. A method of producing an electrode comprises the following (a) to (d):

(a) preparing an active material powder, the active material powder including a foreign particle and an active material particle;

(b) preparing a first electrode material including the active material powder;

(c) performing dry classification treatment on the first electrode material to decrease the foreign particle included in the first electrode material; and (d) forming an active material layer including the first electrode material after the dry classification treatment.

The first electrode material is in powder form. The foreign particle includes a metal foreign object and is a coarse particle.

The metal foreign object that may adversely influence battery performance is a coarse particle. The coarse particle is outside the particle size distribution of the active material powder. The coarse particle may be separated from the active material powder by classification treatment. Therefore, classification treatment on the active material powder may decrease the metal foreign object that may adversely influence battery performance. The classification treatment, in its principle, is not influenced by magnetic force. Regardless of whether the active material particle and the foreign particle are magnetic substances, they can be separated from each other. Further, because the classification treatment is a dry process, solvent usage may be decreased.

The metal foreign object may be oxidized at its surface, for example. That is, the foreign particle may further include metal oxide and/or the like in addition to the metal foreign object.

The first electrode material may consist of the active material powder. That is, the active material powder may be subjected to classification by itself. In addition to the active material powder, the first electrode material may further include at least one selected from the group consisting of a conductive material, a solid electrolyte, and a binding material. That is, a mixed powder including the active material powder may be subjected to classification.

2. The (d) may include the following (d2) and (d3), for example:

(d2) preparing a powdery and granular composition by mixing the first electrode material after the dry classification treatment with a second electrode material; and (d3) coating a surface of a substrate with the powdery and granular composition.

The second electrode material may include, for example, at least one selected from the group consisting of a conductive material, a solid electrolyte, a binding material, and a solvent.

For example, a material to be used for electrode production may be categorized as the first electrode material and the second electrode material. The second electrode material may include a group of materials suitable for magnetic separation treatment, for example. The material suitable for magnetic separation treatment may consist essentially of a nonmagnetic substance, for example. The material suitable for magnetic separation treatment may be subjected to magnetic separation treatment.

The powdery and granular composition has a powdery and granular appearance. The powdery and granular composition may be applied to coat a surface of a substrate to form an active material layer. The powdery and granular composition may include a small amount of solvent. However, the powdery and granular composition is different from a slurry (a particle dispersion). In the powdery and granular composition, the solvent is dispersed as liquid drops in solid material (powder, granules). On the other hand, in a slurry, solid material is dispersed in solvent (a dispersion medium).

3. The powdery and granular composition may have a solid fraction from 70 to 100% by mass, for example.

The "solid fraction" refers to the mass fraction of all the components other than the solvent included in the mixture, relative to the total mass of the mixture. For example, when the binding material is dissolved in the solvent, the binding material (solute) is regarded as "a component other than the solvent". For example, a powdery and granular composition having a solid fraction of 100% does not essentially include a solvent. A powdery and granular composition having a solid fraction of 100% may be in the form of dry powder or dry granules. For example, a powdery and granular composition having a solid fraction not lower than 70% and lower than 100% may be in the form of wet powder or wet granules. It should be noted that a slurry may have a solid fraction equal to or lower than 60% by mass, for example. Granules may also be called "a granulated body".

4. The (d) may further include the following (d1) before the (d2):

(d1) performing magnetic separation treatment on at least part of the second electrode material to decrease a magnetic metal particle included in the second electrode material.

For example, the second electrode material as a whole (a mixed powder) may be subjected to magnetic separation treatment. For example, only a part of the second electrode material (for example, only the conductive material) may be subjected to magnetic separation treatment. When the second electrode material is subjected to magnetic separation treatment, the metal foreign object in the electrode may be further decreased.

5. The active material particle may be magnetic.

When the active material particle is magnetic, the separation efficiency of the magnetic separation treatment is decreased. When the active material particle is magnetic, dry classification treatment may be particularly effective.

6. The coarse particle has a shorter diameter and a longer diameter. The shorter diameter may be twice a D99 of the active material powder, or greater, for example. The D99 refers to a particle size in volume-based particle size distribution at which cumulative frequency of particle sizes accumulated from a small size side reaches 99% of all particles.

The coarse particle is present in a trace amount. It is expected that the coarse particle is not included in the particle size distribution up to D99. D99 may also be called "Dmax".

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a conceptual view illustrating a second coating method.

DETAILED DESCRIPTION

Definitions of Terms, Etc

Figure 1:
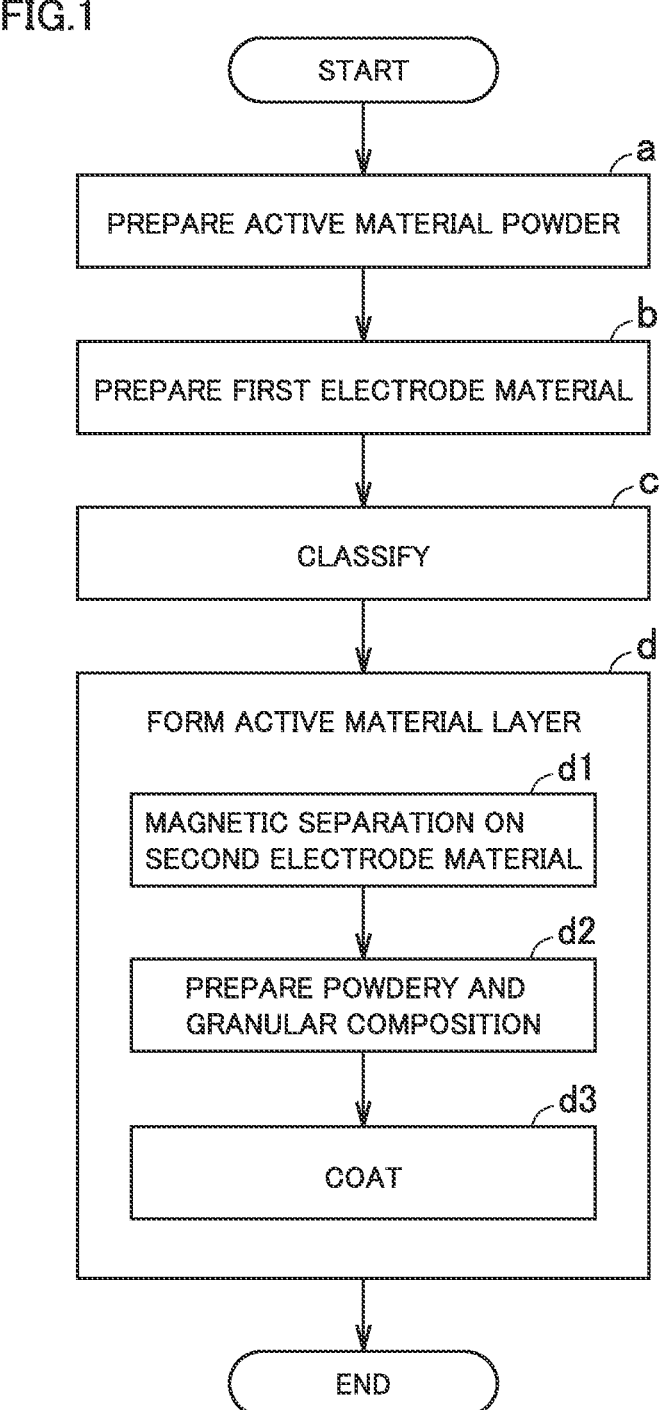
FIG. 1 is a schematic flowchart illustrating a method of producing an electrode according to the present embodiment.

Next, an embodiment of the present disclosure (which may also be simply called "the present embodiment") and an example of the present disclosure (which may also be simply called "the present example") will be described. It should be noted that neither the present embodiment nor the present example limits the technical scope of the present disclosure.

Herein, expressions such as "comprise", "include", and "have", and other similar expressions (such as "be composed of", for example) are open-ended expressions. In an open-ended expression, in addition to an essential component, an additional component may or may not be further included. The expression "consist of" is a closed-end expression. However, even when a closed-end expression is used, impurities present under ordinary circumstances as well as an additional element irrelevant to the technique according to the present disclosure are not excluded. The expression "consist essentially of" is a semiclosed-end expression. A semiclosed-end expression tolerates addition of an element that does not substantially affect the fundamental, novel features of the technique according to the present disclosure.

In the method described in the present specification, the order for implementing a plurality of steps, operations, processes, and the like is not limited to the described order, unless otherwise specified. For example, a plurality of steps may proceed simultaneously. For example, a plurality of steps may be implemented in reverse order.

Herein, expressions such as "may" and "can" are not intended to mean "must" (obligation) but rather mean "there is a possibility" (tolerance).

Herein, a singular form also includes its plural meaning, unless otherwise specified. For example, "a particle" may mean not only "one particle" but also "a group of particles".

Herein, a numerical range such as "from 70 to 100%" includes both the upper limit and the lower limit, unless otherwise specified. That is, "from 70 to 100%" means a numerical range of "not less than 70% and not more than 100%". Moreover, any numerical value selected from a certain numerical range may be used as a new upper limit and/or a new lower limit. For example, any numerical value from a certain numerical range may be combined with any numerical value described in another location of the present specification or in a table or a drawing, for example, to create a new numerical range.

Herein, all the numerical values are regarded as being modified by the term "about". The term "about" may mean ±5%, ±3%, ±1%, and/or the like, for example. Each numerical value is an approximate value that can vary depending on the implementation configuration of the technique according to the present disclosure. Each numerical value is expressed in significant figures. Each of the measured values and the like may be rounded off based on the number of the significant figures. Each numerical value may include an error occurring due to an identification limit of the measurement apparatus, for example.

Herein, when a compound is represented by a stoichiometric composition formula such as "$LiCoO_2$", for example, this stoichiometric composition formula is merely a typical example. Alternatively, the composition ratio may be non-stoichiometric. For example, when lithium cobalt oxide is represented as "$LiCoO_2$", the composition ratio of lithium cobalt oxide is not limited to "Li/Co/O=1/1/2" but Li, Co, and O may be included in any composition ratio, unless otherwise specified. Further, doping with a trace element and/or substitution is also tolerated.

Herein, a particle has a shorter diameter and a longer diameter. The "longer diameter" refers to a distance between two points located farthest apart from each other on the outline of the particle in its image. The "shorter diameter" refers to a diameter that runs perpendicular to the line defining the longer diameter at the central point of the line. The shorter diameter may be equal to the longer diameter.

Herein, the volume-based particle size distribution may be obtained by measurement with a laser-diffraction particle size distribution analyzer. "D50" refers to a particle size in volume-based particle size distribution at which cumulative frequency of particle sizes accumulated from a small size side reaches 50% of all the particles. "D99" refers to a particle size in volume-based particle size distribution at which cumulative frequency of particle sizes accumulated from a small size side reaches 99% of the particles.

Any geometric term herein (such as "parallel" and "perpendicular", for example) should not be interpreted solely in its exact meaning. For example, "parallel" may mean a geometric state that is deviated, to some extent, from exact "parallel". Any geometric term herein may include tolerances and/or errors in terms of design, operation, production, and/or the like. The dimensional relationship in each figure may not necessarily coincide with the actual dimensional relationship. The dimensional relationship (in length, width, thickness, and the like) in each figure may have been changed for the purpose of assisting the understanding of the technique according to the present disclosure. Further, a part of a configuration may have been omitted.

<Method of Producing Electrode>

FIG. 1 is a schematic flowchart illustrating a method of producing an electrode according to the present embodiment. In the following, a method of producing an electrode according to the present embodiment may also be simply called "the present production method". The present production method includes "(a) preparing an active material powder", "(b) preparing a first electrode material", "(c) classification", and "(d) forming an active material layer".

In the present production method, an electrode for a lithium-ion battery may be produced, for example. However, a lithium-ion battery is merely an example. The present production method may be applied to any battery system. In the present production method, at least one of a positive electrode and a negative electrode may be produced.

<<(a) Preparing Active Material Powder>>

The present production method includes preparing an active material powder. The active material powder may be prepared by any method. For example, an off-the-shelf active material powder may be commercially obtained. For example, the active material powder may be obtained by producing the active material powder. For example, the active material powder may be produced via such processes as raw material mixing, coprecipitation, calcination, pulverization, sizing, magnetic separation, and packaging.

The active material powder includes a foreign particle and an active material particle. The active material powder may have a D50 from 1 to 30 µm, for example. The active material powder may have a D50 from 5 to 20 µm, for example. The active material powder may have a D99 less than 50 µm, for example. The active material powder may have a D99 from 30 to 40 µm, for example. The foreign particle is coarse and is present in a trace amount. Because of this, it is expected that the foreign particle is not included in the particle size distribution up to D99. Therefore, it is expected that D50 and D99 does not substantially change before and after the classification.

<Foreign Particle>

The active material powder may inevitably include the foreign particle. The foreign particle is a coarse particle. The foreign particle may have a shorter diameter of 50 µm or more, for example. The foreign particle may have a shorter diameter of 1 mm or less, for example. For example, the shorter diameter of the foreign particle may be twice the D99 of the active material powder, or greater. For example, the shorter diameter of the foreign particle may be 2 to 10 times, or may be 2 to 5 times, or may be 2 to 3 times the D99 of the active material powder.

The number of foreign particles included in the active material powder may be measured by the below procedure. A predetermined amount of the active material powder is dispersed in a dispersion medium to prepare a particle dispersion. For example, N-methyl-2-pyrrolidone (NMP) is suitable as a dispersion medium. A filter is prepared. The filter has apertures of 38 µm. The particle dispersion is filtered through the filter. The residue remaining on the filter is analyzed by SEM-EDX (Scanning Electron Microscope-Energy Dispersive X-ray spectroscopy). The field of view is subjected to image analysis to count the particles having a shorter diameter of 50 µm or more. At the same time, qualitative analysis is performed for the composition of the particles. In this way, the number of foreign particles having a shorter diameter of 50 µm or more is measured. The resulting number of foreign particles is displayed as the number per 10 g of the active material powder.

For example, the active material powder may include 1 to 100 foreign particles per 10 g, with the remainder being made up of the active material particle. For example, the active material powder may include 5 to 50 foreign particles per 10 g, with the remainder being made up of the active material particle. For example, the active material powder may include 10 to 30 foreign particles per 10 g, with the remainder being made up of the active material particle. It should be noted that the active material powder may include, for example, $10^6$ to $10^7$ active material particles per 10 g.

For example, the active material powder may include 0.1 to 100 ppm (parts per million) (in a mass fraction) of the foreign particle, with the remainder being made up of the active material particle. The mass fraction of the foreign particle may be measured by ICP-AES (Inductively Coupled Plasma-Atomic Emission Spectroscopy) and/or the like.

The foreign particle includes a metal foreign object. The metal foreign object is not expected to contribute to electrode reaction. For example, in a lithium-ion battery, the electrode reaction refers to lithium-ion occlusion reaction and lithium-ion release reaction. The foreign particle may consist essentially of the metal foreign object. The foreign particle may include, for example, at least one selected from the group consisting of stainless steel (SUS), iron (Fe), nickel (Ni), chromium (Cr), silicon (Si), manganese (Mn), molybdenum (Mo), and copper (Cu). The metal foreign object, partially or as a whole, may form an oxide, a carbide, and/or a nitride, for example. On the surface of the metal foreign object, an oxide layer may be formed, for example. The foreign particle may further include, for example, at least one selected from the group consisting of oxygen, carbon, nitrogen, phosphorus, and sulfur, in addition to a metal.

The active material powder may include Fe in a mass fraction from 0.1 to 10 ppm, for example. The active material powder may include Cu in a mass fraction from 10 to 100 ppb (parts per billion), for example.

<Active Material Particle>

The active material particle includes an active material. The active material may cause electrode reaction. The active material particle may consist essentially of an active material. The active material particle may include an optional component. The active material particle may include a positive electrode active material. The active material particle may include a negative electrode active material. The active material particle may include, for example, at least one selected from the group consisting of $LiCoO_2$, $LiNiO_2$, $LiMnO_2$, $LiMn_2O_4$, $Li(NiCoMn)O_2$, $Li(NiCoAl)O_2$, $LiFePO_4$, Si, SiO, Sn, SnO, and $Li_4Ti_5O_{12}$. "(NiCoMn)" in "$Li(NiCoMn)O_2$", for example, means that the constituents within the parentheses are collectively regarded as a single unit in the entire composition ratio. As long as (NiCoMn) is collectively regarded as a single unit in the entire composition ratio, the amounts of individual constituents are not particularly limited. $Li(NiCoMn)O_2$ may include, for example, $Li(Ni_{1/3}Co_{1/3}Mn_{1/3})O_2$, $Li(Ni_{0.5}Co_{0.2}Mn_{0.3})O_2$, $Li(Ni_{0.8}Co_{0.1}Mn_{0.1})O_2$, and/or the like.

The active material particle may be magnetic. For example, an active material particle that includes a transition metal element such as Fe, Co, and/or Ni may be magnetic. For example, $Li(NiCoMn)O_2$ and $LiFePO_4$ may be magnetic.

<<(b) Preparing First Electrode Material>>

The present production method includes preparing a first electrode material. The first electrode material is in powder form. The first electrode material includes the active material powder. For example, the first electrode material may consist of the active material powder. For example, in addition to the active material powder, the first electrode material may further include other powder materials. Such other powder materials may include, for example, at least one selected from the group consisting of a conductive material, a solid electrolyte, and a binding material.

For example, the active material powder and such other powder materials may be simply mixed to prepare the first electrode material. For example, the first electrode material may be prepared so that a composite particle is formed. For example, a conductive material, a solid electrolyte, a binding material, and/or the like may be fixed to the surface of the active material particle to form a composite particle. The composite particle may be formed by a mechanochemical method, for example.

<Conductive Material>

The conductive material may be in powder form. The conductive material may form an electron conduction path in an electrode. The conductive material may include an optional component. The conductive material may include a conductive carbon particle, a conductive carbon fiber, and/or the like, for example. The conductive material may include, for example, at least one selected from the group consisting of carbon black, vapor grown carbon fiber, carbon nanotube, graphene flake, and graphite. The carbon black may include, for example, at least one selected from the group consisting of acetylene black, furnace black, channel black, and thermal black.

The conductive material may also include a foreign particle (a metal foreign object). The details of the foreign particle are as described above. The foreign particle may enter into the conductive material during production of the latter.

The number of foreign particles included in the conductive material may be measured by the below procedure. The conductive material is dispersed in a sodium polytungstate (SPT) solution to prepare a sample liquid. The resulting sample liquid is treated by centrifugation to collect a precipitate. The resulting precipitate is analyzed by SEM-EDX. The field of view is subjected to image analysis to count the particles having a shorter diameter of 50 μm or more. At the same time, qualitative analysis is performed for the composition of the particles. In this way, the number of foreign particles having a shorter diameter of 50 μm or more is measured. The resulting number of foreign particles is displayed as the number per 10 g of the conductive material.

For example, the conductive material may include 1 to 100 foreign particles per 10 g, with the remainder being made up of carbon particles (or carbon fibers). For example, the conductive material may include 5 to 50 foreign particles per 10 g, with the remainder being made up of carbon particles. For example, the conductive material may include 10 to 30 foreign particles per 10 g, with the remainder being made up of carbon particles.

For example, the conductive material may include 0.1 to 100 ppm (in a mass fraction) of the foreign particle, with the remainder being made up of carbon particles. The mass fraction of the foreign particle may be measured by ICP-AES and/or the like.

<Solid Electrolyte>

The solid electrolyte may be in powder form. For example, when the electrode is for an all-solid-state battery, the electrode may include a solid electrolyte. The solid electrolyte may form an ion conduction path in the electrode. The solid electrolyte may include, for example, at least one selected from the group consisting of $Li_2S$—$P_2S_5$, $LiI$—$Li_2S$—$P_2S_5$, $LiBr$—$Li_2S$—$P_2S_5$, and $LiI$—$LiBr$—$Li_2S$—$P_2S_5$.

<Binding Material>

The binding material may be in powder form. The binding material may bond solid materials in the electrode to each other. The binding material may include an optional component. The binding material may include, for example, at least one selected from the group consisting of polyvinylidene difluoride (PVdF), polytetrafluoroethylene (PTFE), vinylidene difluoride-hexafluoropropylene copolymer (PVdF-HFP), styrene-butadiene rubber (SBR), carboxymethylcellulose (CMC), polyimide (PI), polyamide-imide (PAI), and polyacrylic acid (PAA).

There is a possibility that a foreign particle may also enter into the solid electrolyte and the binding material. For example, the number of foreign particles included in the binding material may be measured by the same procedure as for the conductive material. Using results of qualitative analysis of the foreign particle, whether or not the foreign particle included in each material is a magnetic substance may be determined. Based on the results of qualitative analysis of the foreign particle, which material to subject to magnetic separation treatment (described below) may be determined.

<<(c) Classification>>

The present production method includes performing dry classification treatment on the first electrode material to decrease the foreign particle included in the first electrode material.

In the dry classification treatment, substantially no liquid is used and classification is performed in the air (or in gas). For example, the classification may be performed in a nitrogen gas atmosphere. In wet classification treatment, the classification is performed in liquid.

The present production method may include, before the classification treatment, drying the first electrode material. Drying the first electrode material is expected to enhance the separation efficiency. It may be because the decrease in moisture reduces the likelihood of particle aggregation. For example, the first electrode material may be dried with the use of a flash dryer and/or the like. For example, the first electrode material may be dried so that the moisture content becomes 500 ppm or less (in a mass fraction). The moisture content of the first electrode material may be measured by Karl Fischer method.

In the present production method, any dry classifier may be used. For example, an air classifier, a dry sieve classifier, and/or the like may be used. For example, a dry sieve classifier can be more compact than an air classifier. In addition, a dry sieve classifier tends to consume less energy than an air classifier does. Using a dry sieve classifier is expected to reduce production costs, for example.

The first electrode material is classified with the dry classifier. The cut size is set in such a manner that the target coarse particles can be separated. For example, the cut size may be set at a size greater than the D99 of the active material powder. For example, the cut size may be set at a size equal to or greater than twice the D99 of the active material powder. The classification treatment may be performed once. The classification treatment may be performed twice or more.

By the dry classification treatment, the foreign particle (a coarse particle) may be decreased. For example, the dry classification treatment may be performed so that the number of foreign particles in 10 g of an active material layer (described below) becomes less than 6. For example, the dry classification treatment may be performed so that the number of foreign particles in 10 g of the active material layer becomes equal to or less than 1.

<<(d) Forming Active Material Layer>>

The present production method includes forming an active material layer including the first electrode material after the dry classification. When the first electrode material includes a binding material, the first electrode material may be applied to coat a surface of a substrate.

For example, a second electrode material may be added to the first electrode material after the classification. The second electrode material may include, for example, at least one selected from the group consisting of a conductive material, a solid electrolyte, a binding material, and a solvent. The details of the conductive material, the solid electrolyte, and the binding material are as described above.

<Solvent>

The solvent is liquid. The solvent may facilitate particle aggregation in a powdery and granular composition (described below). The solvent according to the present embodiment is, in other words, "a granulation promoter". The solvent may include water, an organic solvent, and/or the like, for example. The solvent may include a component capable of dissolving the binding material. The solvent may include, for example, at least one selected from the group consisting of water, butyl butyrate, and NMP.

<(d1) Magnetic Separation of Second Electrode Material>

For example, "(d) forming an active material layer" may include "(d1) performing magnetic separation of the second electrode material", "(d2) preparing a powdery and granular composition", "(d3) coating", and the like.

For example, the second electrode material may consist essentially of a nonmagnetic substance. For example, at least part of the second electrode material may be subjected to magnetic separation treatment. By this, a magnetic metal particle included in the second electrode material (a metal foreign object) may be decreased. For example, the magnetic separation treatment may be performed by passing at least part of the second electrode material through a magnet filter. The magnetic separation treatment may be performed for individual materials, respectively. For example, the magnetic separation treatment may be performed for each of the conductive material and the binding material, respectively. For example, the magnetic separation treatment may be performed for a mixture of the conductive material and the binding material.

<(d2) Preparing Powdery and Granular Composition>

For example, a powdery and granular composition may be prepared by mixing the first electrode material after the classification with the second electrode material. The second electrode material may be the one obtained after the magnetic separation.

For example, the powdery and granular composition may be prepared with the use of any mixer, stirrer, granulator, and/or the like. The powdery and granular composition may be either in powder form or in granular form. The powdery and granular composition includes an active material powder and a binding material. The powdery and granular composition may further include a conductive material and a solid electrolyte. For example, the powdery and granular composition may include the binding material in a mass fraction from 1 to 10%, the conductive material in a mass fraction from 0 to 10%, and the solid electrolyte in a mass fraction from 0 to 50%, with the remainder being made up of the active material powder. For example, the powdery and granular composition may include the binding material in a mass fraction from 1 to 10% and the conductive material in a mass fraction from 1 to 10%, with the remainder being made up of the active material powder.

The powdery and granular composition may further include a solvent. That is, the powdery and granular composition may include at least one selected from the group consisting of dry powder, dry granules, wet powder, and wet granules. The powdery and granular composition may have a solid fraction from 70 to 100% by mass, for example. The powdery and granular composition may have a solid fraction from 75 to 100% by mass, for example. The powdery and granular composition may have a solid fraction from 80 to 100% by mass, for example.

<(d3) Coating>

The powdery and granular composition may be applied to coat a surface of a substrate. By this, an active material layer may be formed on the surface of the substrate. The active material layer includes the first electrode material after the classification.

In the present production method, the powdery and granular composition may be applied for coating by any method. Each of a first coating method and a second coating method described below is merely an example. For example, a roll-to-roll method may be adopted to perform continuous coating. By this, productivity is expected to be enhanced.

<Substrate>

The substrate may be in sheet form, for example. The substrate may be an electrode current collector, for example. The substrate may include a metal foil, for example. The substrate may include, for example, at least one selected from the group consisting of an aluminum (Al) foil, an Al alloy foil, a Cu foil, a Cu alloy foil, a Ni foil, a Ni alloy foil, a titanium (Ti) foil, and a Ti alloy foil. The substrate may have a thickness from 5 to 50 μm, or may have a thickness from 10 to 30 μm, for example.

<First Coating Method>

Figure 2:
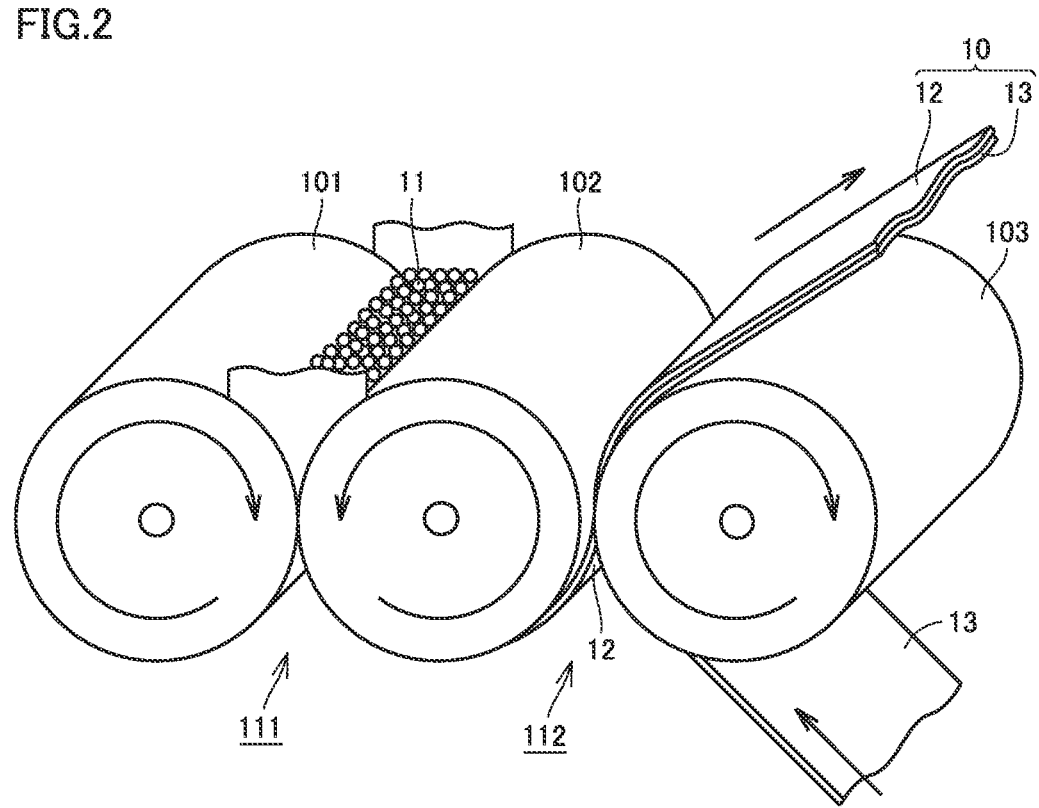
FIG. 2 is a conceptual view illustrating a first coating method.

FIG. 2 is a conceptual view illustrating a first coating method. The first coating method is similar to a liquid membrane transfer method. In the first coating method, three rolls are used. A first roll 101, a second roll 102, and a third roll 103 may be aligned in the horizontal direction, for example. The rotation axes of the rolls are parallel to each other. The arrow on each roll shows the direction of rotation of the roll.

A first roll gap 111 is formed between first roll 101 and second roll 102. A second roll gap 112 is formed between second roll 102 and third roll 103.

To first roll gap 111, a powdery and granular composition 11 is fed. Powdery and granular composition 11 is leveled at first roll gap 111, and thereby an active material layer 12 is formed. Second roll 102 conveys active material layer 12 to second roll gap 112. Third roll 103 conveys a substrate 13. At second roll gap 112, active material layer 12 is transferred onto substrate 13. That is, an electrode 10 including active material layer 12 and substrate 13 is formed.

In the first coating method, the powdery and granular composition may include at least one of wet powder and wet granules, for example. The powdery and granular composition may have a solid fraction from 70 to 90% by mass, for example.

<Second Coating Method>

Figure 3:
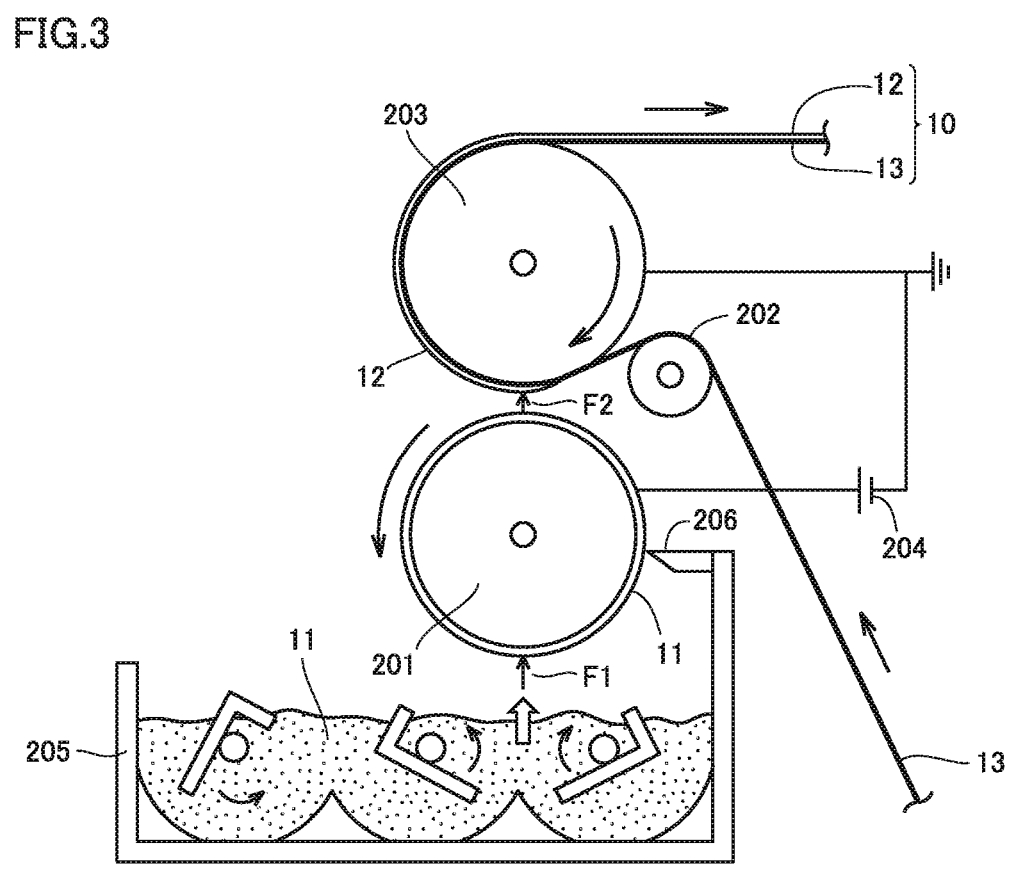

FIG. 3 is a conceptual view illustrating a second coating method. In the second coating method, electrostatic coating is carried out. A first roll 201, a second roll 202, and a third roll 203 have their rotation axes in parallel to each other. Third roll 203 may be positioned above first roll 201 in the vertical direction. An electric power supply 204 forms an electric field between first roll 201 and third roll 203. First roll 201 comprises a magnet.

Powdery and granular composition 11 is fed into a vessel 205. In vessel 205, powdery and granular composition 11 may be stirred. For example, in vessel 205, powdery and granular composition 11 may be mixed with a ferromagnetic substance. Powdery and granular composition 11 is adsorbed onto first roll 201 by a magnetic force F1 of first roll 201. First roll 201 conveys powdery and granular composition 11. Powdery and granular composition 11 is partially removed with the use of a squeegee 206, and thereby, powdery and granular composition 11 present across a certain area is fed to the roll gap between first roll 201 and third roll 203.

Second roll 202 conveys substrate 13. Substrate 13 is fed to the roll gap between first roll 201 and third roll 203.

The electric field between first roll 201 and third roll 203 is formed so that an electrostatic force F2 applied to powdery and granular composition 11 is greater than magnetic force F1 applied to powdery and granular composition 11. Electrostatic force F2 pulls powdery and granular composition 11 away from first roll 201. Further, electrostatic force F2 makes powdery and granular composition 11 fly toward third roll 203. On a surface of third roll 203, substrate 13 is supported. Powdery and granular composition 11 adheres to the surface of substrate 13, and thereby active material layer 12 may be formed. That is, electrode 10 including active material layer 12 and substrate 13 is formed.

In the second coating method, the powdery and granular composition may include at least one of dry powder and dry granules, for example. The powdery and granular composition may have a solid fraction from 90 to 100% by mass, for example. The powdery and granular composition may have a solid fraction of 100% by mass, for example.

In the above manner, an electrode (a raw sheet) may be produced. When the powdery and granular composition (an active material layer) includes a solvent, the electrode may be dried. For example, at least one of pressure and heat may be applied to the active material layer to make the active material layer fixed to the substrate.

Further, according to the battery design, the electrode may be compressed into a predetermined thickness. According to battery design, the electrode may be cut into a predetermined planar shape.

The active material layer may be formed on only one side of the substrate. The active material layer may be formed on both sides of the substrate. The active material layer may have a thickness from 10 to 1000 μm, for example. Active material layer 12 may have a thickness from 50 to 200 μm, for example.

According to the present production method, the metal foreign object in the active material layer is decreased. The number of foreign particles in 10 g of the active material layer may be less than 6. The number of foreign particles in 10 g of the active material layer may be equal to or less than 1.

The number of foreign particles included in the active material layer is measured by the below procedure. The active material layer is peeled off the substrate, and thereby the active material layer is collected. The resulting active material layer (a powdery and granular composition) is dispersed in a dispersion medium to prepare a particle dispersion. For example, NMP is suitable as the dispersion medium. A filter is prepared. The filter has apertures of 38 μm. The particle dispersion is filtered through the filter. The residue remaining on the filter is analyzed by SEM-EDX. The field of view is subjected to image analysis to count the particles having a shorter diameter of 50 μm or more. At the same time, qualitative analysis is performed for the composition of the particles. In this way, the number of foreign particles having a shorter diameter of 50 μm or more is measured. The resulting number of foreign particles is displayed as the number per 10 g of the active material layer.

EXAMPLES

Next, the present example is described.

<Preparing Materials>

Electrode materials listed in Table 1 below were prepared. By the procedure described above, the number of foreign particles included in each material was measured. Measurement results are given in Table 1 below. The number of foreign particles refers to the number per 10 g of each material.

TABLE 1

| Electrode material | Composition | Form | Foreign particles (shorter diameter ≥50 μm) | |
|---|---|---|---|---|
| | | | Number of Fe particles | Number of Cu particles |
| Active material powder | Li(NiCoMn)O$_2$ | Powder | 15 | 2 |
| Conductive material | Acetylene black | Powder | 24 | 0 |
| Binding material | PVdF | Powder | 0 | 0 |

<Producing Electrode>

Production Example 1

The active material powder, the conductive material, the binding material, and a solvent (NMP) were mixed to prepare a powdery and granular composition. The resulting powdery and granular composition included wet granules. The solid matter ratio was "(active material powder)/(conductive material)/(binding material)=97.5/1/1.5 (mass ratio)". By the first coating method (see FIG. 2), an active material layer was formed. That is, an electrode was produced. By the procedure described above, the number of foreign particles included in the active material layer was measured. Measurement results are given in Table 2 below.

Production Example 2

In Production Example 2, magnetic separation treatment was performed on the active material powder and the conductive material before preparation of the powdery and granular composition. Except this, the same procedure as in Production Example 1 was carried out to produce an electrode.

Production Example 3

In Production Example 3, dry classification treatment was performed on the active material powder before preparation of the powdery and granular composition. In this example, a dry sieve classifier was used. Further, magnetic separation treatment was performed on the conductive material before preparation of the powdery and granular composition. Except these, the same procedure as in Production Example 1 was carried out to produce an electrode.

TABLE 2

| Production Example | Electrode material Foreign object-decreasing treatment | | | Active material layer Foreign particles (shorter diameter ≥50 μm) | |
|---|---|---|---|---|---|
| | Active material powder | Conductive material | Binding material | Number of Fe particles | Number of Cu particles |
| 1 | None | None | None | 14 | 1 |
| 2 | Magnetic separation | Magnetic separation | None | 4 | 2 |
| 3 | Dry classification | Magnetic separation | None | 0 | 0 |

<Results>

The active material powder and the conductive material, in raw material stages, included foreign particles (Fe particles, Cu particles) (Table 1 above).

The results of Production Examples 1 and 2 showed a tendency that the magnetic separation treatment on the active material powder and the conductive material decreased foreign particles in the active material layer (electrode) (Table 2 above). It should be noted that some foreign particles are not separated off by the magnetic separation treatment and enter into the active material layer.

The results of Production Example 3 showed a tendency that the dry classification treatment on the active material powder markedly decreased foreign particles in the active material layer (Table 2 above). It seems that the dry classification treatment is capable of separating off foreign particles that cannot be separated off by the magnetic separation treatment.

Additional Statement

The present disclosure also relates to a method of producing a battery.

The method of producing a battery includes the following (a) to (f):

(a) preparing an active material powder, the active material powder including a foreign particle and an active material particle;

(b) preparing a first electrode material including the active material powder;

(c) performing dry classification treatment on the first electrode material to decrease the foreign particle included in the first electrode material;

(d) forming an active material layer including the first electrode material after the dry classification treatment;

(e) producing an electrode that includes the active material layer; and (f) producing a battery that includes the electrode.

The first electrode material is in powder form. The foreign particle includes a metal foreign object and is a coarse particle.

The method of producing a battery may include a method of producing a lithium-ion battery, for example. In addition to the electrode, the battery may further include a battery casing (a case), a separator, an electrolyte solution, and the like, for example.

The present disclosure also relates to a method of producing an active material powder.

The method of producing an active material powder includes the following (a) and (c):

(a) synthesizing an active material powder that includes a foreign particle and an active material particle; and (c) performing dry classification treatment on the active material powder to decrease the foreign particle included in the active material powder.

The foreign particle includes a metal foreign object and is a coarse particle.

The method of producing an active material powder may further include performing magnetic separation treatment on the active material powder, for example. The method of producing an active material powder may further include packaging the active material powder after the classification with a packaging material, for example. The packaging material may include a container, a pouch, and/or the like, for example.

The present embodiment and the present example are illustrative in any respect. The present embodiment and the present example are non-restrictive. The technical scope of the present disclosure encompasses any modifications within the meaning and the scope equivalent to the terms of the claims. For example, it is expected that certain configurations of the present embodiments and the present examples can be optionally combined.

What is claimed is:

1. A method of producing an electrode comprising:

(a) preparing an active material powder, the active material powder including a foreign particle and an active material particle;

(b) preparing a first electrode material including the active material powder;

(c) performing a dry classification treatment on the first electrode material to separate out coarse particles and decrease the foreign particle included in the first electrode material, wherein the dry classification treatment is performed with a cut size greater than a D99 of the active material powder, where D99 refers to a particle size in a volume-based particle size distribution at which cumulative frequency of particle sizes accumulated from a small size side reaches 99% of all particles; and (d) forming an active material layer including the first electrode material after the dry classification treatment by:

(d1) performing a magnetic separation treatment on a conductive material to decrease a magnetic metal particle included in the conductive material;

(d2) preparing a powdery and granular composition by mixing the first electrode material after the dry classification treatment with a second electrode material comprising the conductive material; and (d3) coating a surface of a substrate with the powdery and granular composition by electrostatic coating, wherein:

the first electrode material is in powder form, the foreign particle includes a metal foreign object and is a coarse particle; and coating the surface of the substrate with the powdery and granular composition by electrostatic coating comprises:

feeding the powdery and granular composition into a vessel;

adsorbing the powdery and granular composition from the vessel onto a first roll by a magnetic force of the first roll;

conveying the substrate, using a second roll, to a roll gap between the first roll and a third roll, wherein the first roll, the second roll, and the third roll have parallel axes;

supporting the substrate on a surface of the third roll; and forming an electric field between the first roll and the third roll such that an electrostatic force pulls the powdery and granular composition toward the third roll and causes the powdery and granular composition to become adhered to the substrate.

2. The method of producing an electrode according to claim 1, wherein the powdery and granular composition has a solid fraction from 70 to 100% by mass.

3. The method of producing an electrode according to claim 1, wherein the active material particle is magnetic.

4. The method of producing an electrode according to claim 1, wherein the coarse particle has a shorter diameter and a longer diameter, the shorter diameter is twice the D99 of the active material powder, or greater.

5. The method of producing an electrode according to claim 1, wherein:

the conductive material is in powder form; and performing the magnetic separation treatment on the conductive material comprises passing the conductive material through a magnet filter.

6. The method of producing an electrode according to claim 5, wherein the conductive material comprises a conductive carbon particle, a conductive carbon fiber, or both.

7. The method of producing an electrode according to claim 5, wherein the conductive material is selected from the group consisting of carbon black, vapor grown carbon fiber, carbon nanotube, graphene flake, and graphite.

8. The method of producing an electrode according to claim 5, wherein the conductive material is carbon black selected from the group consisting of acetylene black, furnace black, channel black, and thermal black.

9. The method of producing an electrode according to claim 1, further comprising mixing the powdery and granular composition in the vessel with a ferromagnetic substance.

* * * * *